US008654435B2

(12) United States Patent
Ishii

(10) Patent No.: US 8,654,435 B2
(45) Date of Patent: Feb. 18, 2014

(54) MICROWINDOW DEVICE

(76) Inventor: Fusao Ishii, Pittsburg, PA (US)

( * ) Notice: Subject to any disclaimer, the term of this patent is extended or adjusted under 35 U.S.C. 154(b) by 0 days.

(21) Appl. No.: 13/200,992

(22) Filed: Oct. 5, 2011

(65) Prior Publication Data

US 2012/0086999 A1 Apr. 12, 2012

Related U.S. Application Data

(60) Provisional application No. 61/404,617, filed on Oct. 6, 2010.

(51) Int. Cl.
*G02B 26/00* (2006.01)
*G02B 26/08* (2006.01)

(52) U.S. Cl.
USPC ............ 359/291; 359/198; 359/223; 359/237

(58) Field of Classification Search
USPC ................. 359/290–292, 296, 223–226, 198, 359/301–303, 237, 242
See application file for complete search history.

(56) References Cited

U.S. PATENT DOCUMENTS

| | | | |
|---|---|---|---|
| 4,727,047 A | 2/1988 | Bozler et al. | |
| 5,317,236 A | 5/1994 | Zavracky et al. | |
| 5,552,925 A * | 9/1996 | Worley | 359/230 |
| 5,959,763 A * | 9/1999 | Bozler et al. | 359/290 |
| 7,417,782 B2 | 8/2008 | Hagood et al. | |
| 7,460,290 B2 | 12/2008 | Hagood et al. | |
| 7,463,227 B2 | 12/2008 | Van Gorkom et al. | |
| 7,995,263 B1 * | 8/2011 | Ruan | 359/290 |
| 7,999,994 B2 | 8/2011 | Hagood et al. | |
| 8,157,389 B2 * | 4/2012 | Maeda et al. | 353/85 |
| 2006/0018005 A1 * | 1/2006 | Ishii | 359/291 |
| 2006/0077531 A1 | 4/2006 | Novotny et al. | |
| 2006/0187528 A1 | 8/2006 | Hagood et al. | |
| 2009/0149004 A1 | 6/2009 | Ichikawa et al. | |
| 2010/0046062 A1 * | 2/2010 | Maeda et al. | 359/291 |
| 2010/0182496 A1 * | 7/2010 | Brady et al. | 348/362 |

* cited by examiner

*Primary Examiner* — Dawayne A Pinkney
(74) *Attorney, Agent, or Firm* — Bo-In Lin

(57) ABSTRACT

The present invention provides a transmissive Spatial Light Modulator with fast response speed and higher brightness using micro-windows having switching transistors on said window so that the fill factor of light transferring area can be maximized. Conventional systems have transistors out of windows which substantially reduce the area to pass incoming light, because transistors are usually opaque and block light transmission. Transmissive Spatial Light Modulator requires simpler and smaller optics than reflective Spatial Light Modulator.

19 Claims, 13 Drawing Sheets

MICROWINDOW DEVICE

PRIORITY OF APPLICATION

This Patent Application is a Non-provisional Application and claims the Priority Date of a Provisional Application 61/404,617 filed on Oct. 6, 2010 by a common Inventor of this Application. The Disclosures made in the Patent Application 61/404,617 are hereby incorporated by reference.

BACKGROUND OF THE INVENTION

The present invention relates to an image display system that modulates illumination light from a light source and displays two-dimensional images. More particularly, this invention relates to an image display system implemented with a spatial light modulator which modulates incoming light by opening and closing micro-windows configured as a two dimensional pixel array.

After the dominance of cathode ray tube (CRT) technology in the display industry over the past 100 years, the Flat Panel Display (FPD) and Projection Display technologies are now gaining popularity because of a smaller form-factor of the display control system while projection and display of images of greater size onto a bigger display screen can be more conveniently performed. Among several types of projection display systems, projection display systems using micro-display are gaining consumers' recognition because of high performance of picture quality as well as lower cost than the display systems implemented with FPDs. There are two types of micro-display technologies implemented in the projection display systems now made available in the market. The first type of display system is the micro-LCD (Liquid Crystal Display) system and the other type display system is the display system that implements the micromirror technology. The images displayed from a micromirror device have a significant advantage because of higher brightness by displaying the images by projecting an un-polarized light over the display image projected from a micro-LCD system, which uses polarized light.

More specifically, the electromechanical mirror device is drawing a considerable interest as a spatial light modulator (SLM). Micromirror devices have substantial advantages over LCD systems, because they do not use polarized light as LCD and creating polarized light causes substantial loss of incoming light nearly 50%. Furthermore, the micromirror devices also have substantial faster response time than LCD and this faster speed enables Color Sequential Control, meaning using a single device and alternating colors as fast as viewers do not recognize the change of colors.

Additionally, due to the slow speed, the LCD image projection systems typically are required to implement three panels and do not allow for Color Sequential Control. Compared with systems implemented with three panels, the image display systems implemented with a single panel has significant cost advantages of providing with device with a much lower cost than the three panel systems.

Even though the micromirror devices have significant advantages over the LCD systems, the optics systems are usually more complicated because of reflection systems rather than transmissive systems. Reflective optical systems often require larger sizes than transmissive optical system. The advantages and cost benefits of the micromirror devices are adversely affected due to this requirement of a larger optical system when the reflective optical configuration is implemented. In addition to the requirement of optics of larger size, the reflective display devices are further limited to application in the projection display apparatuses while the transmissive display systems have broader applications for implementation in the direct view and projection display systems, such as the LCD display systems.

U.S. Pat. Nos. 7,417,782 and 7,460,290 disclose MEMS Shutters such as that shown in FIG. 15A, with shutters employ the sliding shutter to open and shut off a shutter manufactured by the MEMS technology. However, such systems are limited by the fact that the structure cannot have more than 50% of opening due to its sliding door type structure. In contrast, the Micro-windows can achieve higher brightness and are more desirable because the micro-windows have higher opening ratio.

The technical article, "Magneto-structural Simulation of a MEMS Micro-shutter" by Abed M. Khaskia published at FEMCI Workshop/NASA GSFC on Jun. 15, 2004, shows that micro-shutter with torsion hinge actuated by magnetic force. However, this structure as that shown in FIG. 15B, requires high power to drive.

Therefore, a need still exists in the art of image display projection systems. More particularly in the micromirror device display system to provide a new and improved optical configuration and design methods to simplify the optical transmission configurations and reduce the size of the spatial light modulator (SLM) such that the difficulties and limitations as now encountered by those of ordinary skill in the art can be resolved. Another need exists to improve the brightness and resolution of direct view LCD display systems whose light utilization is below 10% and requires three color dots in a pixel.

SUMMARY OF THE PREFERRED EMBODIMENTS

Therefore, one aspect of this invention is to disclose a new image display system with fast and bright transmissive display configuration to enable a display system implemented with a single device Color Sequential Control. The image display system has simpler optics and more compact size thus providing a more cost effective apparatus while achieving higher performance by displaying images with improved quality.

Specifically, it is an aspect of this invention that provides a new image display system with fast and bright transmissive display configuration by making and using movable micro-windows to operate in an open or close state for modulating and controlling the pixels to display color images with high speed control while reducing the overall size of the optical system.

While the novel features of the invention are set forth with particularly in the appended claims, the invention, both as to organization and content, will be better understood and appreciated, along with other objects and features thereof, from the following detailed description taken in conjunction with the drawings.

DETAILED DESCRIPTION OF THE PREFERRED EMBODIMENTS

Figure 1:
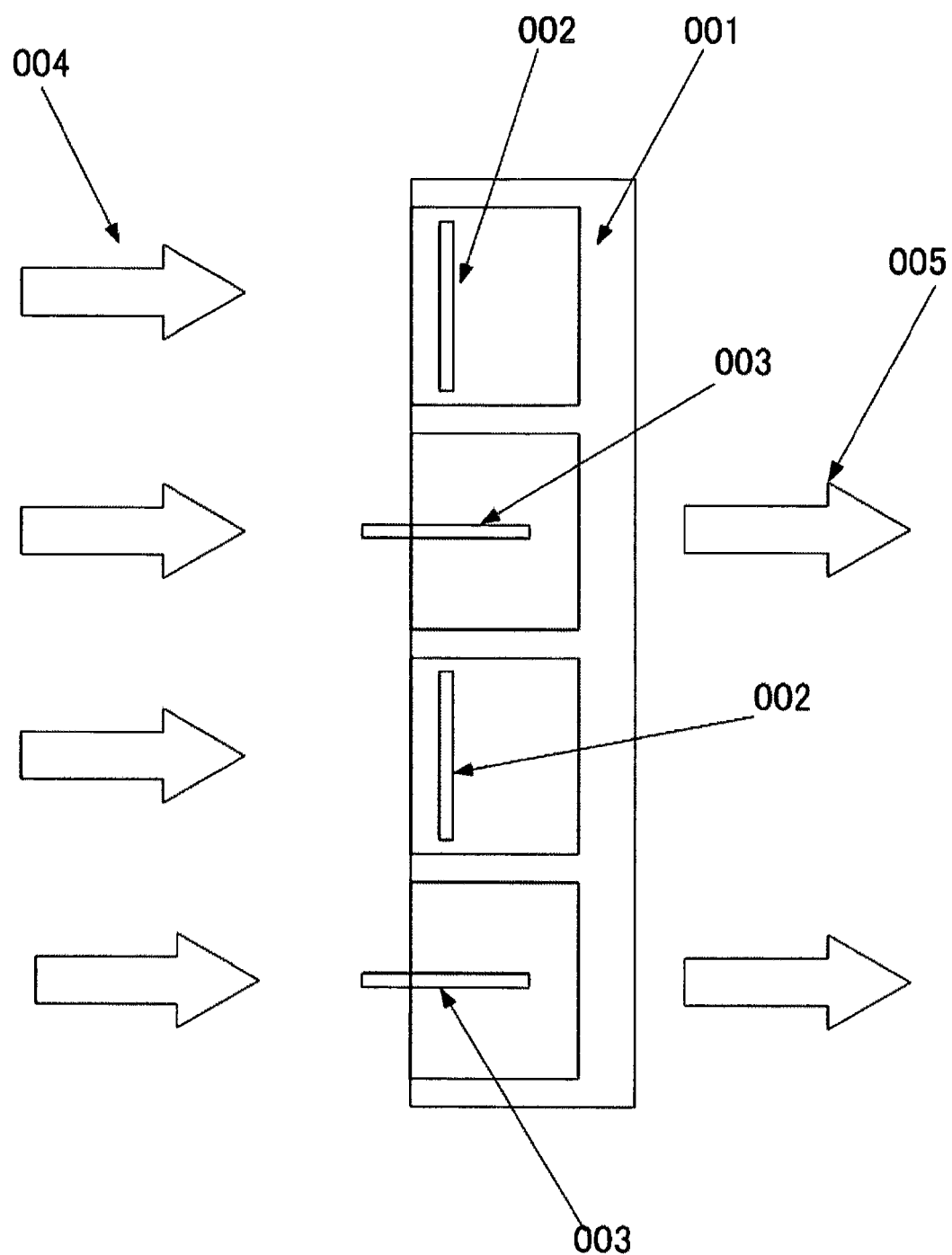
FIGS. 1 and 2 are a side view and a top view to illustrate the basic concepts of the micro-windows of this invention.
Figure 2:
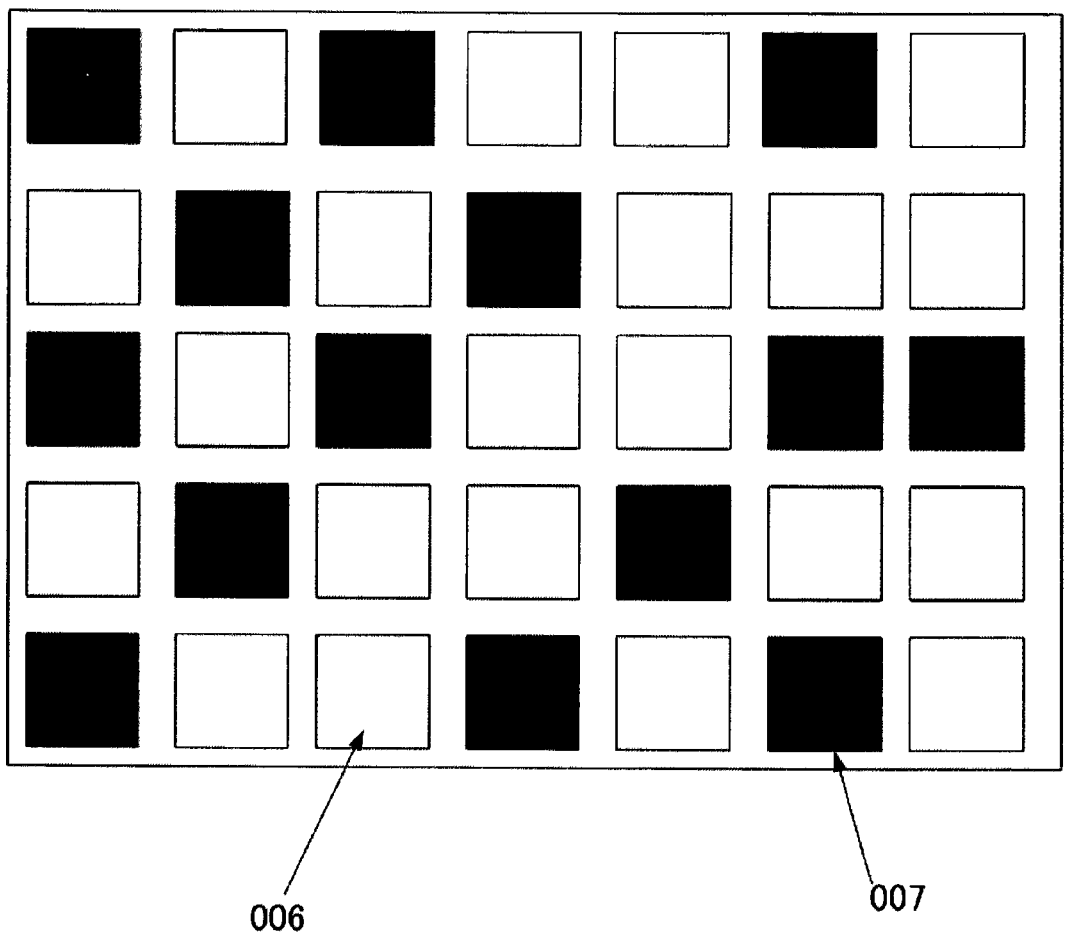
Figure 4:
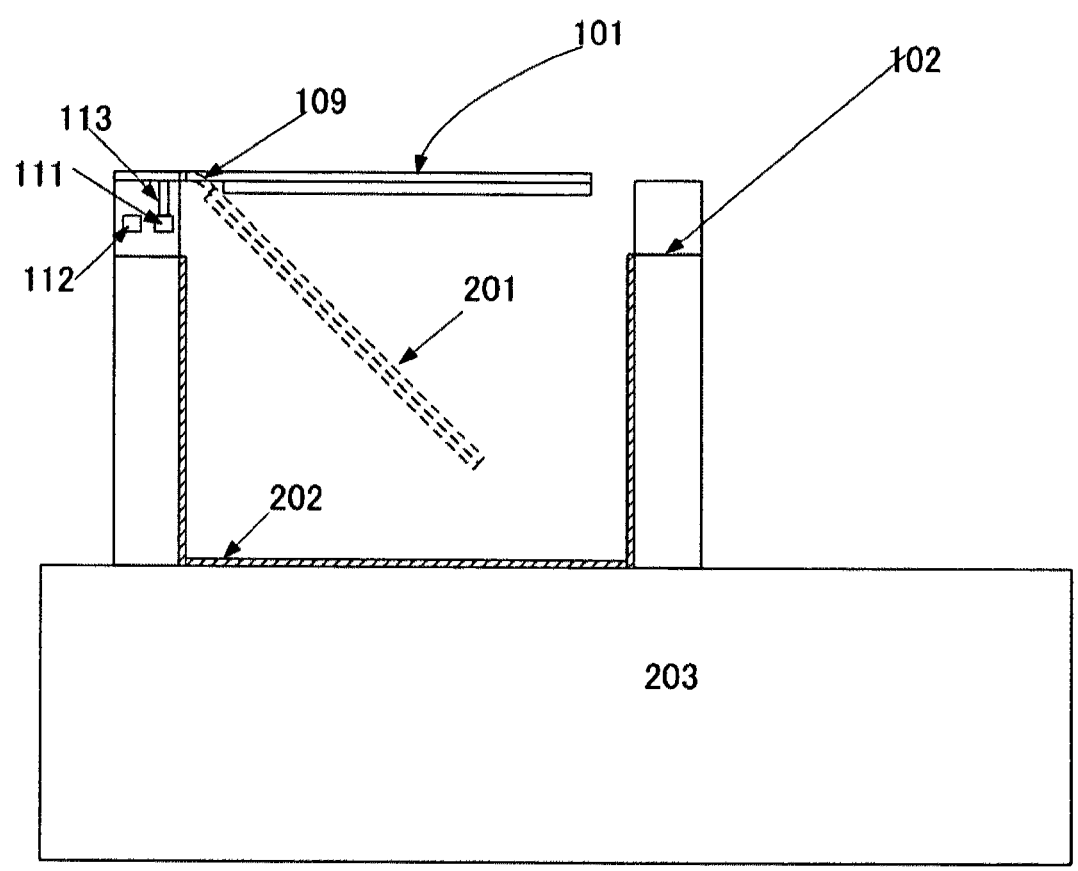
FIG. 4 is a side cross-section view of the micro-mirror element across a line A-A of FIG. 3.

FIG. 1 and FIG. 2 show a basic concept of micro-windows. 004 in FIG. 4 is incoming light toward all pixels. Each of the pixels has a movable micro-window as 002 and 003. 002 is a closed window which shut light off and 003 is a open window which allow incoming light to go through. FIG. 2 shows an array of display using micro-windows. 005 is an open window and the pixel looks bright and 006 is a closed window and the pixel looks dark.

Figure 3:
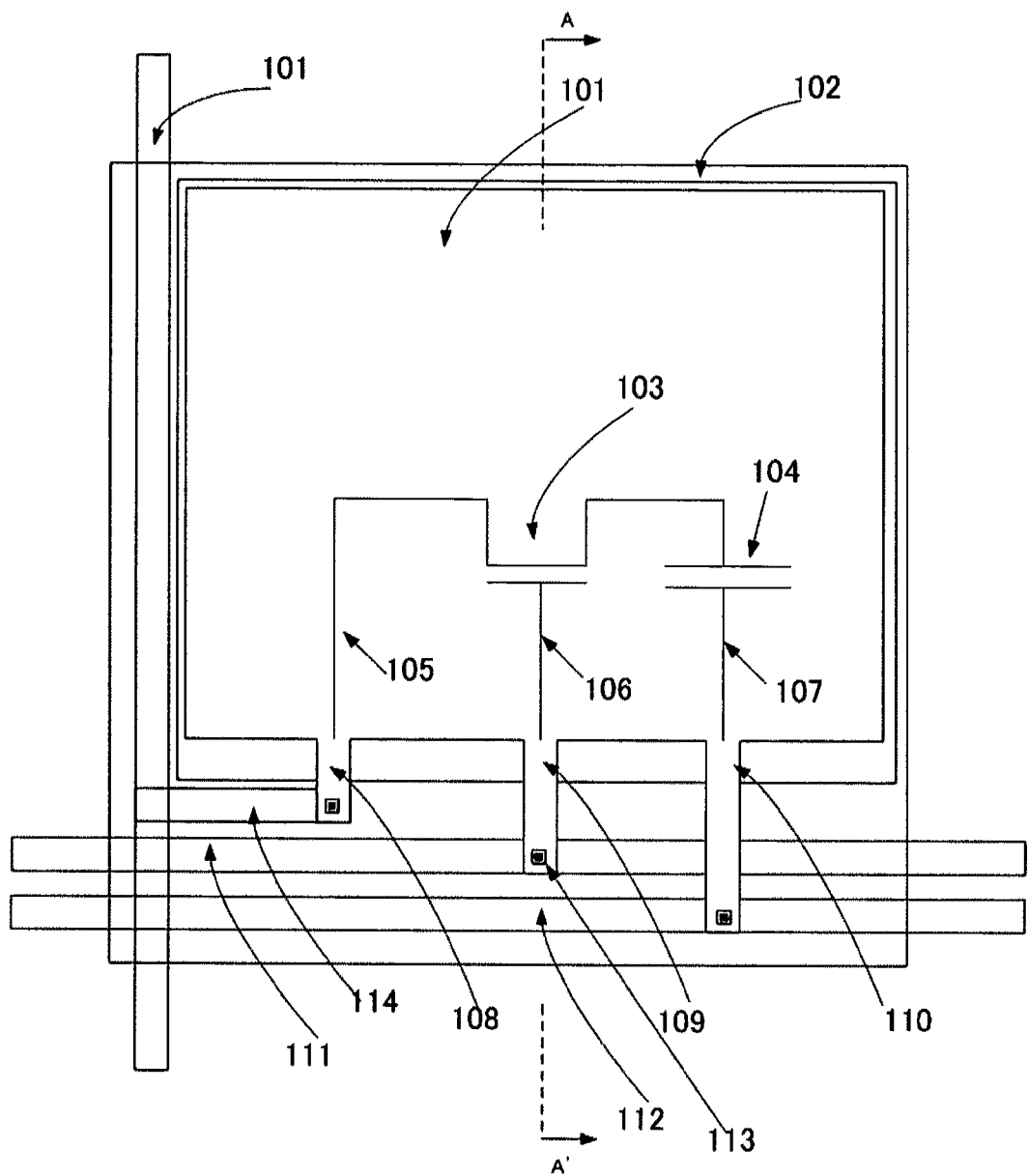
FIG. 3 is a side view of a mirror element for illustrating the structure and operation of the micro-window.

FIG. 3 shows an example of this imvention. 101 is a plate functioning as a micro-window, which moves with the hinges, 108, 109 and 110. This example has 3 hinges made of cantilevers. The window, 101, can move around the horizontal axis with the 3 hinges as a door. 102 is a stationary frame. The window, 101, is driven with an electro-static force. A voltage is applied to the window from the bit-line 101 and the word-line 111 with a ground line of 112. The output voltage of the transistor 103 will be outputted to 104, which is connected to the plate 403 in FIG. 8.

FIG. 4 shows side view at the A-A' line. 203 is a transparent substrate so that light can go through. 101 is the closed position of the window. 201 is a half open position and the window can go to the vertical position depending on the applied voltage. 102 is a side wall of a cavity in a pixel. The sidewalls are covered with a conductive coating, 202, so that the surface is electrically ground.

To apply voltages to the window, 3 hinges are conductive and they are connected to the voltage supply lines shown as bit-line 101 and 114, word-line 111 and ground line 109. The plate forming the window has at least one transistor to select a pixel to apply the incoming voltage from the bit-line (101). Prior arts place a transistor out of windows. However it will reduce the size of windows, because transistors are usually opaque and do not allow light to pass through. This invention allows larger windows because a transistor is placed on a window. After voltage is applied to the capacitor 104, which is also placed on the window, the capacitor will hold the voltage until the next signal writing.

Figure 5:
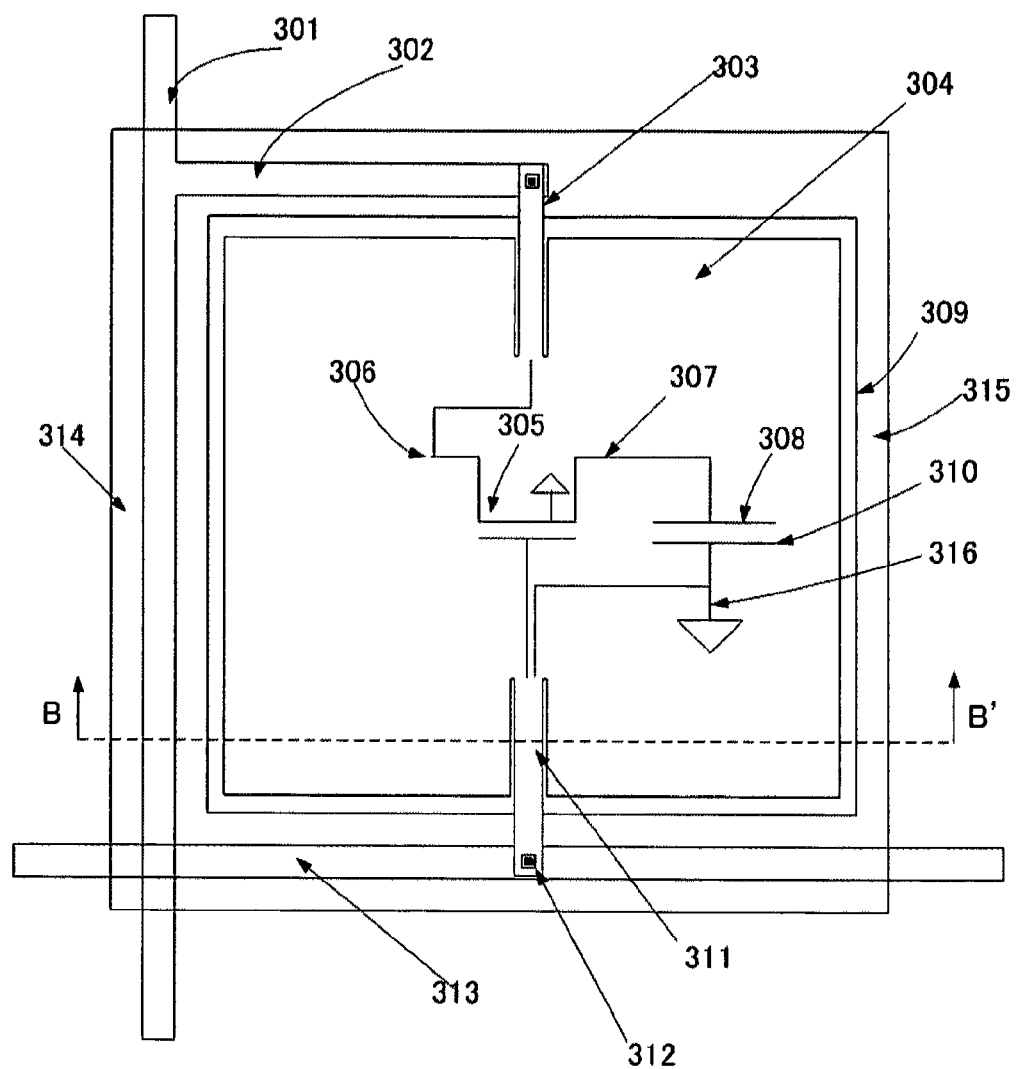
FIG. 5 is a side view of a mirror element as another embodiment of this invention for illustrating the structure and operation of the micro-window.

FIG. 5 is another embodiment of this invention. This example uses two torsion hinges, 303 and 311, to move the window, 304, as well as supplying three voltages to the window. At least one of hinges has to have two layers to supplies two voltages.

Figure 6:
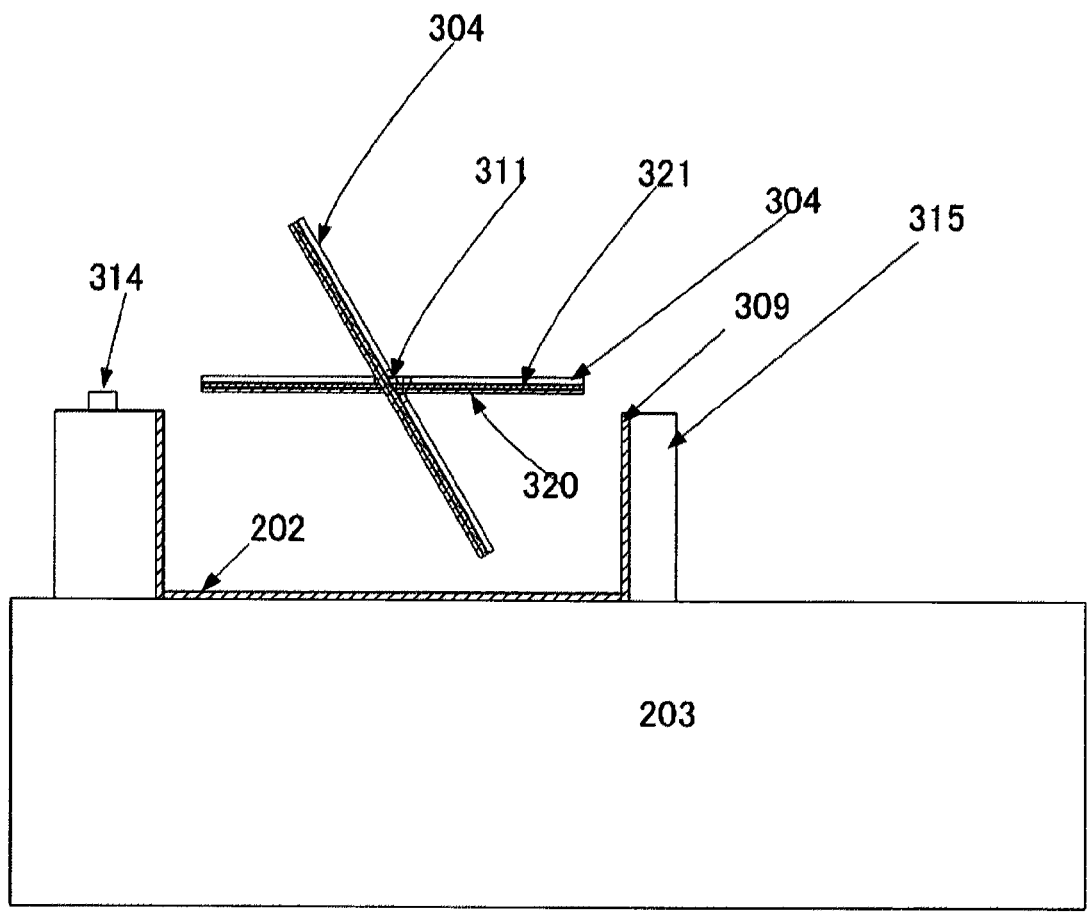
FIG. 6 shows the side view for illustrating the structure of the mirror element of FIG. 5 that uses torsion hinges.

FIG. 6 shows the side view of FIG. 5 structure, which uses torsion hinges. The window 304 rotates around the hinges when voltage is applied to a conductive plate under the window 320 (FIG. 6) or 403 (FIG. 8).

Figure 7:
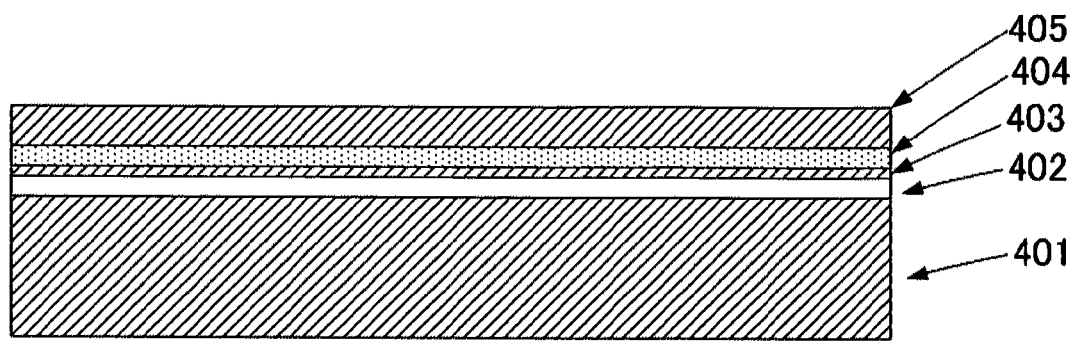
FIG. 7 is a cross sectional view to illustrate an example of substrate to create micro-windows in this invention.

FIG. 7 shows an example of substrate to create micro-windows in this invention. 401 is a substrate having a release layer 402, light blocking opaque and electrically conductive layer 403, insulating layer 404 and semiconductor layer 405. This type of substrate having multi layers is available as double SOI (Silicon-On-Insulator).

Figure 8:
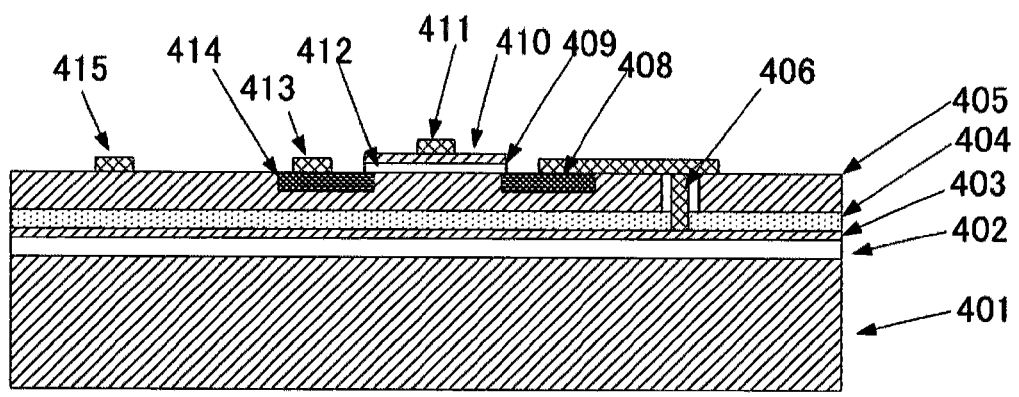
FIG. 8 is a cross sectional view for illustrating an embodiments of this invention using multiple layer substrate as to form FET (Field Effect Transistor) on the top layer.

FIG. 8 is an example of embodiments of this invention. Using multiple layer substrates as described in FIG. 8, FET (Field Effect Transistor) can be formed on the top layer 405. 410 is a gate and 411 is a gate insulator layer. 408 and 414 are Drain and Source. 411 is the connector to the gate, 413 is the connector to the source and 415 is the connector to ground. The word-line voltage is applied to the gate and the video signal is applied to the source which will be passed to the via 406 and the opaque and conductive plate 403. The plate 403 with the voltage will be attracted to the direction of the ground 202 in FIG. 4 or FIG. 6 by electro-static force. The release layer 402 can be etched off with suitable etchant and the layers above the release layer can be lifted off and transferred to a transparent substrate to form a micro-window display as described in FIG. 1, FIG. 2, FIG. 4 and FIG. 6.

Figure 9:
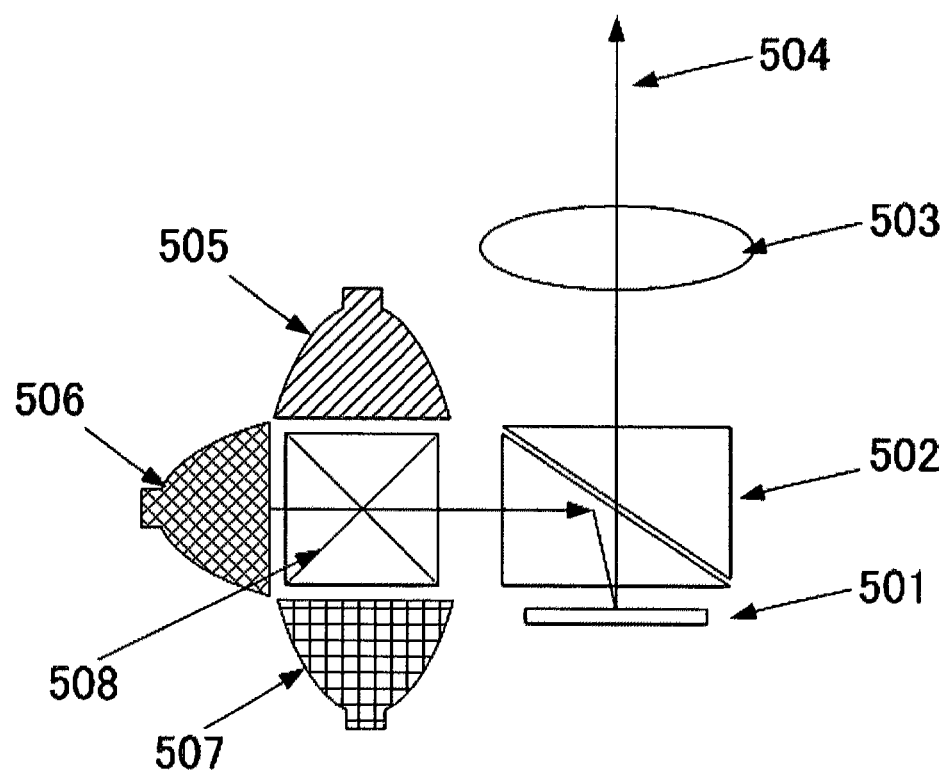
FIG. 9 is a schematic diagram for illustrating an embodiment of the optics of micro-mirror with three light sources.

FIG. 9 shows an example of optics of micro-mirror wherein three light sources, 505, 506 and 507 are used for three different colors and a cross prism 508 is used to integrate said three colors into a same direction and a pair of prism forming total internal reflection (TIR) prism 502 directing incident light toward said micro-mirrors 501 and the reflected lights are projected to a screen 504.

Figure 10:
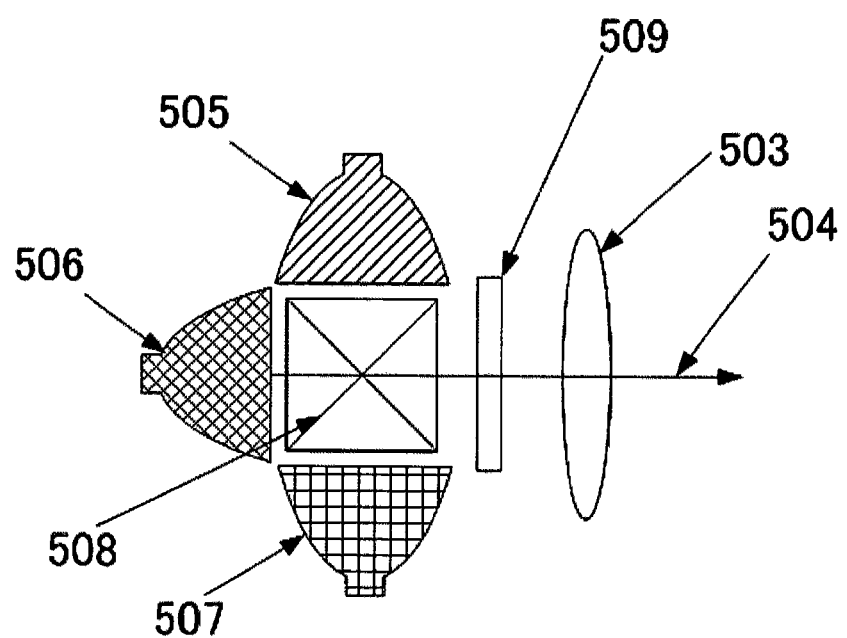
FIG. 10 is a schematic diagram for illustrating an embodiment of the micro-window wherein no total-internal-reflective prism is required.

FIG. 10 shows an example of optics of micro-window 509 wherein no total-internal-reflective prism is required. Thus micro-window simplifies optics and reduces the size of system substantially.

Figure 11:
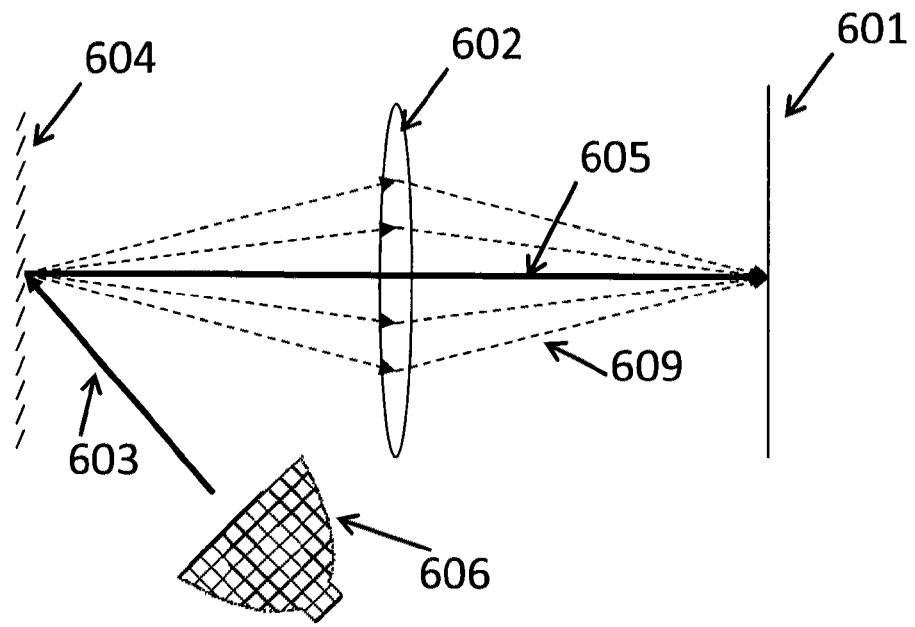
FIG. 11 is a schematic diagram for illustrating a micro mirror optics, wherein the mirrors cause diffraction and diffracted light beams are reflected toward the projection lens.
Figure 12:
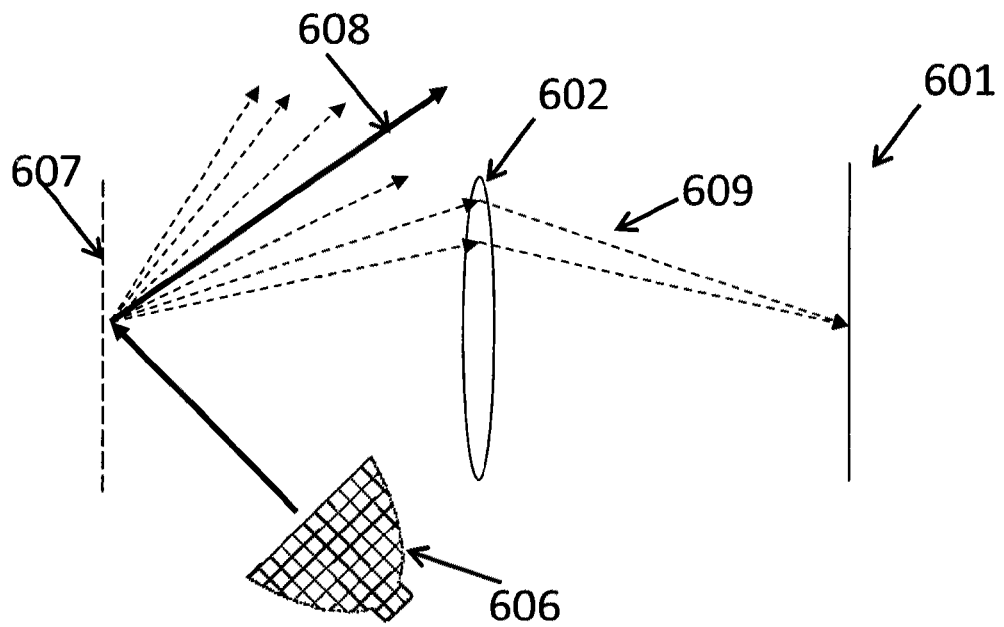
FIG. 12 is a schematic diagram for illustrating a micro mirror optics, wherein the mirror is operated in an OFF position.

FIG. 11 shows an example of micro mirror optics, wherein the mirrors cause diffraction and diffracted light beams are reflected toward the projection lens. When said micromirrors are at ON position, these diffracted light 609 beams from a single mirror are still focused into a single point on a screen 601 and this will not cause a problem. However when said mirror is at OFF position, the diffracted light beams 609 are projected into the lens and some of beams 609 are still projected to the screen. This means that OFF mirrors cannot become completely black, but they will stay as gray as in FIG. 12. As this, undesirable light leakage will take place, especially when laser beam is used as light source because laser has strong coherence and interference which scatters light reflected by periodical structures. This scattering is unavoidable when coherent light such as laser is used.

Figure 13:
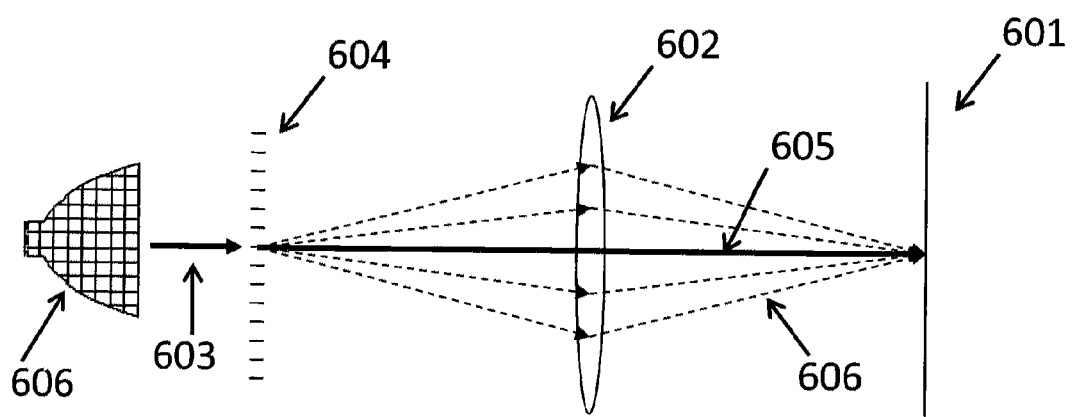
FIG. 13 shows an example of optics of micro-window, wherein outgoing light beams including diffracted beams are projected to the screen.
Figure 14:
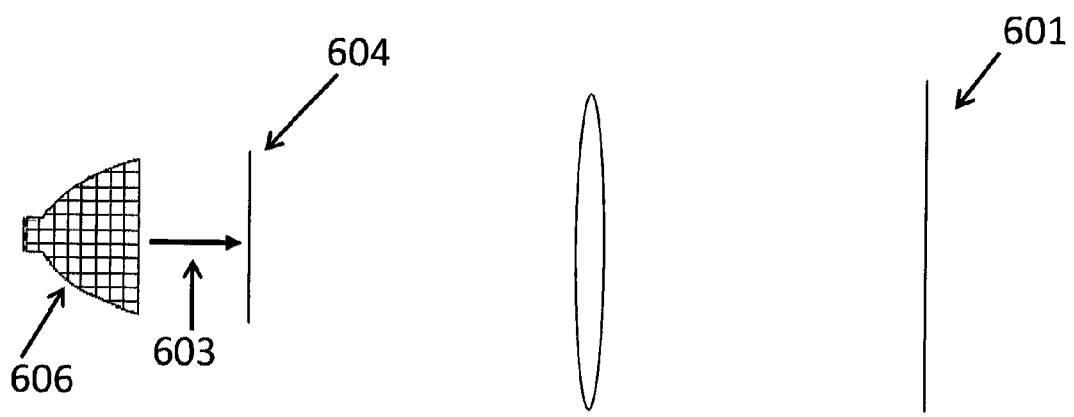
FIG. 14 shows the micro-window operated in an OFF position thus not passing any light to the projection lens nor to the screen.
Figure 15A:
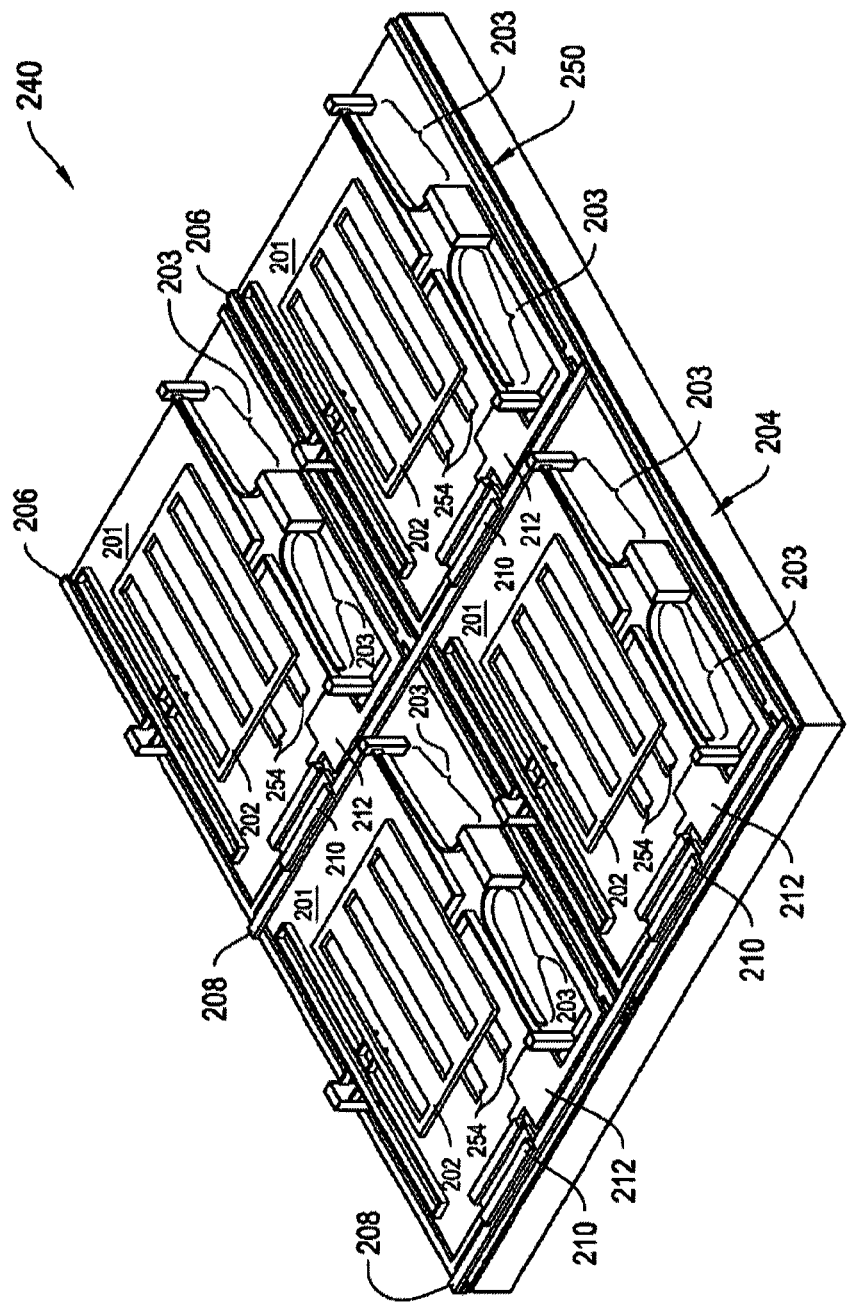
FIGS. 15A and 15B are perspective view and a side view respectively of two conventional display systems implemented with micro-shutter structures.
Figure 15B:
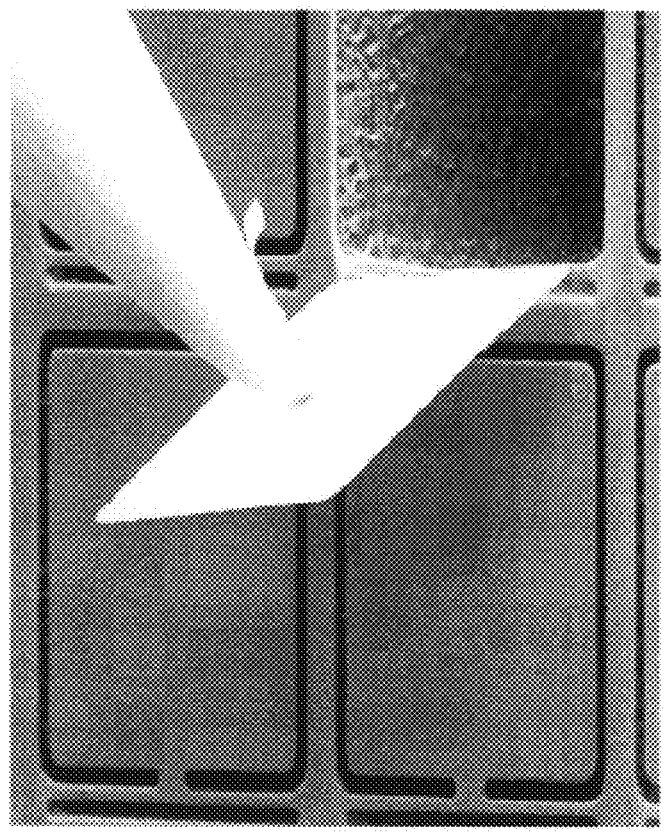
Figure 15B:
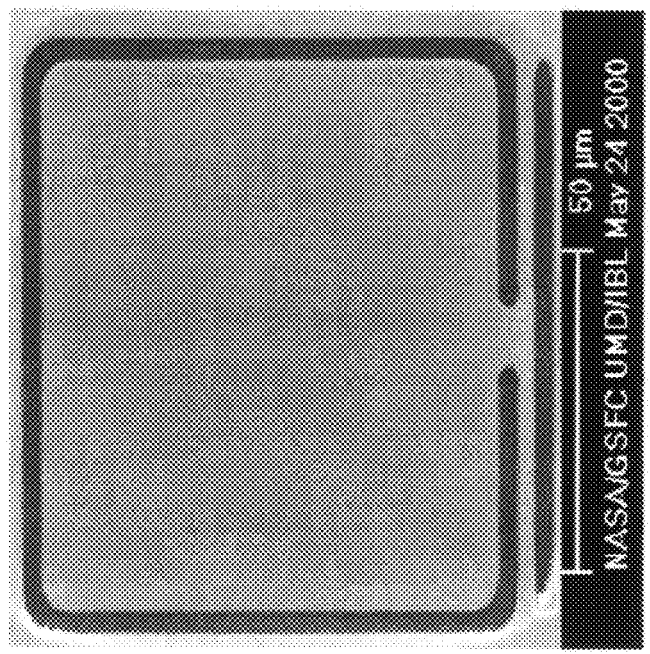

FIG. 13 shows an example of optics of micro-window, wherein outgoing light beams including diffracted beams are projected to the screen as well as micro-mirrors. However, FIG. 14 shows that said micro-window at OFF position does not pass any light to the projection lens nor to the screen, where an OFF position makes complete black at the screen and the contrast will be perfect. Micro-window can avoid undesirable light at OFF position even a laser light source is used. This is a significant advantage of micro-window over reflective display devices.

The main advantage of this invention is substantially larger window than conventional systems; because a transistor requiring a large footprint is placed on a window rather than on a stationary place.

While specific embodiments of the invention have been illustrated and described herein, it is realized that other modifications and changes will occur to those skilled in the art. It is therefore to be understood that the appended claims are intended to cover all modifications and changes as fall within the true spirit and scope of the invention.

What is claimed is:

1. A display system comprising:
a light source for projecting an illumination light to a micro-window device having an array of micro-windows;
each of the micro-windows having a plate held by at least two deflectable hinges extending parallel to a plate surface direction wherein the plate in each of the micro-windows is electrically controllable to rotate to different angles for controlling an amount of the illumination to pass through opening gaps not blocked by each of the micro-windows;
each of the micro-windows comprises electrical circuits having at least one transistor disposed directly on micro-windows for receiving a control signal to electrically control the plate held by the deflectable hinges to rotate to a controllable angle for allowing the amount of illumination light to pass through each of the micro-windows,
wherein each of said hinges is comprised of a doped semiconductor material.

2. The display system according to claim 1, wherein each of said hinges comprises a cantilever extending parallel to the plate surface direction for holding the plate.

3. The display system according to claim 1, wherein each of said hinges comprises a torsion hinge extending parallel to the plate surface direction for holding the plate.

4. The display system according to claim 1, wherein said electrical circuits of each of the micro-windows comprise at least one capacitor.

5. The display system according to claim 1, wherein each of said micro-windows is made and supported on a silicon on insulator (SOI).

6. The display system according to claim 1, wherein each of said micro-windows is made and supported on a silicon on insulator (SOI) having at least one semiconductor layer, at least one opaque layer, at least one electrically insulating layer and at least one release layer wherein the release layer is etched off with a structures above said release layer lifted off for forming and supporting the micro-window array in a transparent substrate.

7. The display system according to claim 1, wherein said transistor comprises a FET (Field effect Transistor).

8. The display system according to claim 6, wherein said release layer is composed of a silicone oxide.

9. The display system according to claim 6, wherein said insulating layer is composed of an aluminum oxide.

10. The display system according to claim 6, wherein said semiconductor layer comprises a silicon layer.

11. The display system according to claim 6, wherein said opaque layer comprises a conductive and reflective material.

12. The display system according to claim 6, wherein said layer is composed of an oxide material.

13. The display system according to claim 3, wherein at least one of said torsion hinges has two separate conductive layers with an insulator layer disposed between said two separate conductive layers.

14. The display system according to claim 1, wherein said array of micro-windows is supported on a transparent substrate.

15. The display system according to claim 1, wherein said transistor comprises a TFT (Thin-Film-Transistor) disposed on a transparent substrate.

16. A display system comprising:
at least one Spatial Light Modulator (SLM) with an array of pixel elements;
at least one light source projecting an illumination light to the SLM; and
each of the pixel elements having a plate held by at least two deflectable hinges extending parallel to a plate surface direction wherein the plate in each of the pixel elements supporting a micro-window wherein the micro-window is electrically controllable by control signals applied to a transistor disposed directly on the micro-window to rotate to different angles for controlling an amount of the illumination light to pass through opening gaps not blocked by each of the micro-windows and wherein the light source further comprises least two colors of light sources and a cross prism to integrate the illumination lights of the two colors projected from the two color light sources,
wherein said cross prism comprises at least two different surfaces.

17. The display system according to claim 16, wherein said color light sources comprises at least two color light sources.

18. The display system according to claim 16, wherein said light sources comprise solid light sources.

19. The display system according to claim 16, wherein:
said color light sources comprising at least one color wheel and at least one lamp.

* * * * *